US012416733B1

(12) United States Patent
Bu et al.

(10) Patent No.: US 12,416,733 B1
(45) Date of Patent: Sep. 16, 2025

(54) DETECTION METHOD OF SPACEBORNE GLOBAL NAVIGATION SATELLITE SYSTEM-REFLECTOMETRY ORIGINAL INTERMEDIATE FREQUENCY COHERENT REFLECTION SIGNALS IN OCEAN, POLAR AND INLAND WATER AREAS (71) Applicant: KUNMING UNIVERSITY OF SCIENCE AND TECHNOLOGY, Kunming (CN)

(72) Inventors: Jinwei Bu, Kunming (CN); Qiulan Wang, Kunming (CN); Qihan Wang, Kunming (CN); Xinyu Liu, Kunming (CN); Xiaoqing Zuo, Kunming (CN); Daming Zhu, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 19/016,075

(22) Filed: Jan. 10, 2025

(30) Foreign Application Priority Data

Apr. 11, 2024 (CN) .......................... 202410431651.X (51) Int. Cl.
G01S 19/29 (2010.01)
G01S 19/23 (2010.01)

(52) U.S. Cl.
CPC .............. G01S 19/29 (2013.01); G01S 19/23 (2013.01)

(58) Field of Classification Search
None
See application file for complete search history.

(56) References Cited

U.S. PATENT DOCUMENTS

2018/0231667 A1* 8/2018 Ye .................... G01S 13/003

FOREIGN PATENT DOCUMENTS

CN 116881721 A 10/2023
CN 117478464 A 1/2024
(Continued)

OTHER PUBLICATIONS

Jin-Wei Bu, et al., Quality comparison and analysis of Beidou/GPS/GLONASS multi system satellite positioning data, Progress in Geophysics, Feb. 15, 2018, 33(1): 1-9. (abstract translated) doi: 10.6038/pg2018BB0495 Related pages: p. 1-9 Claims involved: 1-9.

(Continued)

Primary Examiner — Whitney Moore
(74) Attorney, Agent, or Firm — Pilloff Passino & Cosenza LLP; Rachel Pilloff; Sean Passino (57) ABSTRACT Provided is a detection method of spaceborne GNSS-R original intermediate frequency coherent reflection signals in ocean, polar and inland water areas, including: acquiring spaceborne GNSS-R original intermediate frequency signal data of TDS-1 or CYGNSS and preprocessing the data; selecting coherent detection feature engineering; setting data labels of different scenes and coherent and incoherent reflected signals; dividing a training set and a test set; and training and testing a multimode-oriented hybrid model for coherent and incoherent detection and classification of spaceborne GNSS-R signals, using the training set to train a model, applying a trained detection model to a test data set, and comparing and evaluating obtained detection results with a classical coherent detection algorithm.

5 Claims, 7 Drawing Sheets (56) References Cited

FOREIGN PATENT DOCUMENTS

| | | | |
|---|---|---|---|
| WO | 2022005619 A | 1/2022 | |
| WO | WO-2022005619 A2 * | 1/2022 | ........... G01S 13/955 |

OTHER PUBLICATIONS

Eric Loria, et al., "Comparison of GNSS-R Coherent Reflection Detection Algorithms Using Simulated and Measured CYGNSS Data." IEEE Transactions on Geoscience and Remote Sensing 61 (May 17, 2023): pp. 1-16. doi: 10.1109/TGRS.2023.3277411 Related pages: p. 1-16 Claims involved: 1-9.
Jinwei Bu, et al., "A New Integrated Method of CYGNSS DDMA and LES Measurements for Significant Wave Height Estimation," IEEE Geoscience and Remote Sensing Letters, vol. 19, pp. 1-5, Aug. 11, 2022, Art No. 1505605, doi: 10.1109/LGRS.2022.3198131. Related pages: p. 1-5 Claims involved: 1-9.
The first search report dated Aug. 14, 2024 in SIPO application No. 202410431651.X.
Notification to Grant Patent Right for Invention dated Sep. 6, 2004 in SIPO application No. 202410431651.X.
The first Office action dated Aug. 17, 2024 in SIPO application No. 202410431651.X.

* cited by examiner

DETECTION METHOD OF SPACEBORNE GLOBAL NAVIGATION SATELLITE SYSTEM-REFLECTOMETRY ORIGINAL INTERMEDIATE FREQUENCY COHERENT REFLECTION SIGNALS IN OCEAN, POLAR AND INLAND WATER AREAS

CROSS-REFERENCE TO RELATED APPLICATIONS

This application claims priority to Chinese Patent Application No. 202410431651.X, filed on Apr. 11, 2024, the contents of which are hereby incorporated by reference.

TECHNICAL FIELD

The disclosure belongs to the technical field of Global Navigation Satellite System (GNSS) signal processing and classification identification, and in particular to a detection method of spaceborne Global Navigation Satellite System-Reflectometry (GNSS-R) original intermediate frequency coherent reflection signals in ocean, polar and inland water areas.

BACKGROUND

Coherent signal detection is a very important step in the application of GNSS-R technology to carrier phase altimetry (such as sea surface altimetry, lake surface altimetry, ice height measurement, etc.) and inland water detection, directly affecting the quality and precision of obtaining surface feature information, and then having an important impact on the research and application of related fields. When GNSS signals are reflected from the surfaces of oceans, sea ice, lakes, rivers, wetlands and other inland water, these surfaces are usually smooth enough to generate coherent reflection, and the coherent reflection may be processed to achieve centimeter-level high-precision ranging. However, the GNSS reflected signals received by the GNSS-R instrument also include special features related to the scattered signals of rough land and wind-driven ocean, thus generating incoherent reflection. Therefore, it is necessary to detect and identify coherent and incoherent signals in order to obtain higher precision measurement results.

Currently, detection methods of coherent reflection signals in spaceborne GNSS-R original intermediate frequency signals in ocean, polar and inland water areas reported in domestic and foreign literatures mainly include following three commonly used methods.

Firstly, signal-to-noise ratio (SNR) method, a common method to detect coherent signals and incoherent signals by using SNR. However, factors such as the statistical properties of the signal and noise, data processing, and different scenes need to be taken into account in practical applications to ensure an accurate judgment of signal coherence.

Secondly, a circle length threshold method of carrier phase difference. The circle length method of carrier phase difference is a method to detect coherent signals and incoherent signals by analyzing the phase characteristics of signals. The coherence of the signal may be judged intuitively by the phase information. However, this method is difficult to adapt to and solve the nonlinear classification problem, which leads to the improvement of coherence detection performance.

Thirdly, the circle kurtosis threshold method of carrier phase difference. The circle kurtosis threshold method is a method to detect coherent signals and incoherent signals by analyzing the circular features of signals (the shape of circles). This method is relatively intuitive, but the method needs to select appropriate thresholds and parameters according to specific conditions to ensure accurate judgment of signal coherence. Therefore, the choice of threshold is often unreasonable. This may lead to some good signals being wrongly excluded, or some poor signals being wrongly judged as coherent.

In practical application, the advantages of the above methods are difficult to compare, and theses methods are usually applied to different scenes. In addition, the use of a limited number of features for coherent detection fails to fully consider the nonlinear complex relationship between multimodal feature data and reflected signals, thus affecting the performance of detection classification.

In view of this, the disclosure is proposed.

SUMMARY

In order to overcome the shortcomings of the existing coherent reflection detection method of spaceborne GNSS-R original intermediate frequency signals, the disclosure provides a detection method of spaceborne GNSS-R original intermediate frequency coherent reflection signals in ocean, polar and inland water areas, namely a multimode-oriented hybrid model for coherence detection and classification of spaceborne GNSS-R signals. The detection method is based on a deep learning algorithm and may well solve the nonlinear classification problem of coherent and incoherent detection of the spaceborne GNSS-R signals.

In order to solve the technical problems, a basic idea of a technical scheme used by the disclosure is:

a detection method of spaceborne GNSS-R original intermediate frequency coherent reflection signals in ocean, polar and inland water areas, including following steps:
  step S1, acquiring spaceborne GNSS-R original intermediate frequency signal data of TechDemoSat-1 (TDS-1) and Cyclone Global Navigation Satellite System (CYGNSS) and preprocessing the data;
  step S2, selecting coherent detection feature engineering;
  step S3, setting data labels of different scenes and coherent and incoherent reflected signals;
  step S4, dividing a training set and a test set; and
  step S5, training and testing a multimode-oriented hybrid model for coherent and incoherent detection and classification of spaceborne GNSS-R signals, using the training set to train a model, applying a trained detection model to a test data set, and comparing and evaluating obtained detection results with a classical coherent detection algorithm.

In an embodiment, the spaceborne GNSS-R original intermediate frequency reflected signal data in the step S1 is a single-frequency multi-constellation GNSS (GPS/Galileo/BeiDou-3) original intermediate frequency signal observation data set of a TDS-1 satellite and a CYGNSS satellite, and the preprocessing of the spaceborne GNSS-R original intermediate frequency signal observation data includes direct signal processing, reflected signal processing, observations extraction and data quality control.

The direct signal processing and single-frequency GPS/Galileo/BeiDou-3 reflected signal processing. Specifically, the direct signal processing uses a general GNSS signal processing scheme. Firstly, a code offset and carrier Doppler are roughly collected, and then a combination of delay locked loop (DLL) and phase locked loop (PLL) is used to track a direct signal, where outputs of the direct signal processing include position, velocity and time (PVT) estimation of the TDS-1 satellite and the CYGNSS satellite, signal parameters (code delay, Doppler frequency and carrier phase) of the direct signal, and decoded navigation data bits, etc.

Main inputs of bistatic geometry calculation are positions and velocities of a GNSS-R receiver and a GNSS transmitter. Then, a distance delay difference between the direct signal and a reflected signal is calculated, and a calculation formula is:

$$\delta\rho_{dr}^{OL}(t_0)=|R(t_0)-S'(t_0)|+|T(t_0-\delta t_r)-S'(t_0)|-|T(t_0-\delta t_d)-R(t_0)| \quad (7),$$

where, $T(t_0)$, $R(t_0)$ and $S'(t_0)$ are positions of a transmitter, a receiver and a reflection point respectively, $\delta t_d$ and $\delta t_r$ are propagation times of the direct signal and the reflected signal, respectively.

The observations extraction from spaceborne GNSS-R original intermediate frequency reflected signal data includes signal-to-noise ratio (SNR), carrier phase difference, circle length and circle kurtosis of phase difference, carrier phase estimation, coherence coefficient, power delay Doppler map (DDM) (power_analog), reflectivity DDM, bistatic radar cross section (BRCS) DDM, time delay Doppler waveform, normalized bistatic radar cross section (NBRCS) and so on, where the GNSS-R receiver on the CYGNSS or the TDS-1 performs open-loop (OL) tracking and generates I and Q channel correlator outputs. These correlator outputs are used to derive signal-to-noise ratio (SNR) and carrier phase estimation, where calculation formulas are as follows:

$$SNR_{R,i} = \frac{\sqrt{IP_{R,i}^2 + QP_{R,i}^2} \cdot \sqrt{F_s}}{P_{N,i}}, \quad (8)$$

$$\delta\hat{\Phi}_{R,i} = \frac{-\arctan2(QP_{R,i} \cdot D_{R,i}, IP_{R,i} \cdot D_{R,i}) \cdot \lambda_i}{2\pi}, \quad (9)$$

where $F_s$ is a sampling rate, $P_{N,i}$ is a noise power, regarded as a constant of each tracked GNSS signal, $\tau_i$ is the width of Pseudo Random Noise (PRN) code chip, $\delta\hat{\Phi}_{R,i}$ is a residual carrier phase estimation and $D_{R,i}$ is a navigation data bit.

Moreover, calculation formulas of the reflectivity DDM, bistatic radar cross section (BRCS) DDM and normalized bistatic radar cross section (NBRCS) are as follows:
the reflectivity DDM is estimated as follows:

$$\Gamma(\tau, f) = \frac{(4\pi)^2 P_g(\tau, f)(R_r(\tau_p, f_p) + R_t(\tau_p, f_p))^2}{\lambda^2 G_r(\tau_p, f_p) EIRP(\tau_p, f_p)}, \quad (10)$$

where $R_t$ and $R_r$ are distances from a reflector and the receiver to a specular reflection point respectively, $G_r$ is a receiver antenna gain, $\lambda$ is a reflected signal wavelength, EIRP is a transmitter equivalent isotropic radiation power of a right-handed circularly polarized (RHCP) direct signal, and $P_g$ is a power of a DDM;
the bistatic radar cross section (BRCS) DDM is estimated as follows:

$$BRCS(\tau, f) = \frac{(4\pi)^3 P_g(\tau, f)(R_r(\tau_p, f_p) R_t(\tau_p, f_p))^2}{\lambda^2 G_r(\tau_p, f_p) EIRP(\tau_p, f_p)}; \quad (11)$$

the normalized bistatic radar cross section (NBRCS) is calculated as follows:

$$NBRCS(\tau_p, f_p) = \frac{BRCS(\tau_p, f_p)}{A_{eff}}, \quad (12)$$

where $A_{eff}$ is an effective scattering area of a selected area near a mirror point.

The data quality control specifically follows following standards:

a, for ocean scenes, GNSS signals with a wind speed greater than 8 meters/second (m/s) and an effective wave height greater than 1.2 meters (m) are deleted by using reference data of an ERA5 wind speed and an effective wave height, so as to ensure carrier signal tracking under relatively calm ocean surface conditions;

b, data with an antenna gain less than 0 dBi is deleted; if the antenna gain is too small, the signal is weakened or inaccurate; and c, for the CYGNSS satellite, since blackbody calibration of DDMI of CYGNSS is performed every 60 seconds, when the DDMI is connected to an internal load instead of a CYGNSS scientific antenna, no effective reflected signal is observed during the blackbody calibration; complex waveform (CW) products are not marked with the blackbody calibration in observation, so "black_body_ddm" of a variable "quality_flags" in CYGNSS primary data is used to mark Raw intermediate frequency (IF) observations during calibration by matching a GPS time, and the Raw IF observations are deleted.

In an embodiment, selecting the coherent detection feature engineering in the step S2 is: selecting features reflecting differences between coherent reflection and incoherent reflection, including observations of 50 hertz (Hz) SNR, carrier phase difference, NBRCS, circle length, circle kurtosis and coherence coefficient extracted from observation data; adding coordinates of reflection points and incident angles of reflection points as auxiliary features in consideration of reflection information related to geographical location and incident geometry, and considering other metadata variables (including leading edge slope derived from DDM, receiver antenna gain, transmitter equivalent isotropic radiation power, effective scattering area of DDM and distance correction gain) affecting a coherent detection performance. In addition to the above variables, in order to fully tap and use key features of coherent and incoherent signals in DDM and DDM waveforms, an optimal waveform combination is selected as an input feature of the detection model from three types of DDM (reflectivity DDM, bistatic radar cross section (BRCS) DDM and power DDM), and integrated Doppler delay waveforms and integrated time delay Doppler waveforms (six waveforms in total) calculated by different DDM. In order to further optimize the combination of waveform features for coherent detection, the disclosure adopts a spaceborne GNSS-R waveform feature selection model based on network architecture search to select waveform features with significant sensitivity to coherent and incoherent signals. The model includes two modules of network structure search and feature sensitivity analysis. The network structure search uses different types of waveform feature combinations to classify, train and learn multiple model structures, and optimizes a network structure to improve a classification expression ability; a key lies in designing an overall structure, a hierarchical structure and a unit structure of a model, considering a reasoning relationship of time and space features. The feature sensitivity analysis quantitatively evaluates an influence of features on classification precision, verifies the model and the features through random test sets, analyzes a learning ability and a feature classification performance of network models, and finally selects a best feature combination.

In an embodiment, a method for setting the data labels of the different scenes and the coherent and incoherent reflected signals in the step S3 is manually marking Raw IF signal processed data based on visual inspection to distinguish coherent reflection and incoherent reflection, with label 1 representing the coherent reflection and label 0 representing the incoherent reflection. In addition, in order to classify different scenes of coherent and incoherent reflected signals, there is a need to set labels of ocean, polar, inland water and land scenes as 0, 1, 2 and 3 respectively.

In an embodiment, a method for dividing the training set and the test set in the step S4 is randomly scrambling marked data and dividing into the training set and the test set, where the training set accounts for 60% and the test set accounts for 40%.

In an embodiment, specific implementation of training and testing the multimode-oriented hybrid model for the coherent and incoherent detection and classification of the spaceborne GNSS-R signals in the step S5 is as follows: using the training set to train the model, applying the trained detection model to the test data set, and comparing and evaluating the obtained detection results with the classical coherent detection algorithm.

After using the technical scheme, compared with the prior art, the disclosure has following beneficial effects.

According to that disclosure, the single-frequency multi-constellation GNSS (GPS/Galileo/BeiDou-3) original intermediate frequency reflected signal observation data of the TDS-1 and the CYGNSS are used, and through the theoretical research on the coherence and incoherence of reflected signals and selection of coherent detection feature engineering, data labels of different scenes and coherent and incoherent reflected signals are set, and the training set and the test set are divided, and a training data set is used to train the constructed multimode-oriented hybrid model for the coherent and incoherent detection and classification of the spaceborne GNSS-R signals, and then the trained detection model is applied to the test data set, and the detection results are compared and evaluated. The method may well solve the nonlinear classification problem of coherent and incoherent detection of spaceborne GNSS-R signals, improve the detection precision of spaceborne GNSS-R coherent signals, thus realizing high-precision and high-resolution carrier phase measurement, so the method has great application in ocean, sea ice and inland water.

The specific embodiments of the disclosure will be described in further detail with reference to the accompanying drawings.

BRIEF DESCRIPTION OF THE DRAWINGS

The accompanying drawings, as a part of the disclosure, are used to provide a further understanding of the disclosure. The illustrative embodiments of the disclosure and the descriptions thereof are used to explain the disclosure, but do not constitute an improper limitation of the disclosure. Obviously, the attached drawings in the following description are only some embodiments, and other drawings may be obtained according to these drawings without creative work for ordinary people in the field. In the attached drawings.

It should be noted that these drawings and written descriptions are not intended to limit the conceptual scope of the disclosure in any way, but to explain the concept of the disclosure to those skilled in the art by referring to specific embodiments.

DETAILED DESCRIPTION OF THE EMBODIMENTS

In order to clarify the objectives, technical schemes and advantages of the embodiment of the disclosure, the technical schemes in the embodiment of the disclosure will be described clearly and completely with the accompanying drawings. The following embodiments are used to illustrate the disclosure, but are not used to limit the scope of the disclosure.

Embodiment 1

In order to verify the reliability and advantages of the method proposed by the disclosure, the observation data of TDS-1 original intermediate frequency signals from Sep. 1, 2014 to Mar. 25, 2019, the observation data of CYGNSS original intermediate frequency signals from Aug. 25, 2017 to Jan. 20, 2022, and the Earthstar Geographics map data are obtained for experiments, and the experimental results of the disclosure are compared with the existing coherence detection algorithms.

The experimental environment is Intel® Core™ i7-10700 @ 2.90 GHz eight nuclear CPU, NVIDIA® Geforce RTX™ 2080 SUPER GPU, 32 GB (Crucial® DDR4 3000 MHz) running memory, Windows 10 operating system, experimental platform is Matlab 2019b and Python 3.7, and deep learning Application Programming Interface (API) is tensorflow 2.3.1 and Keras 2.4.3.

Figure 1:
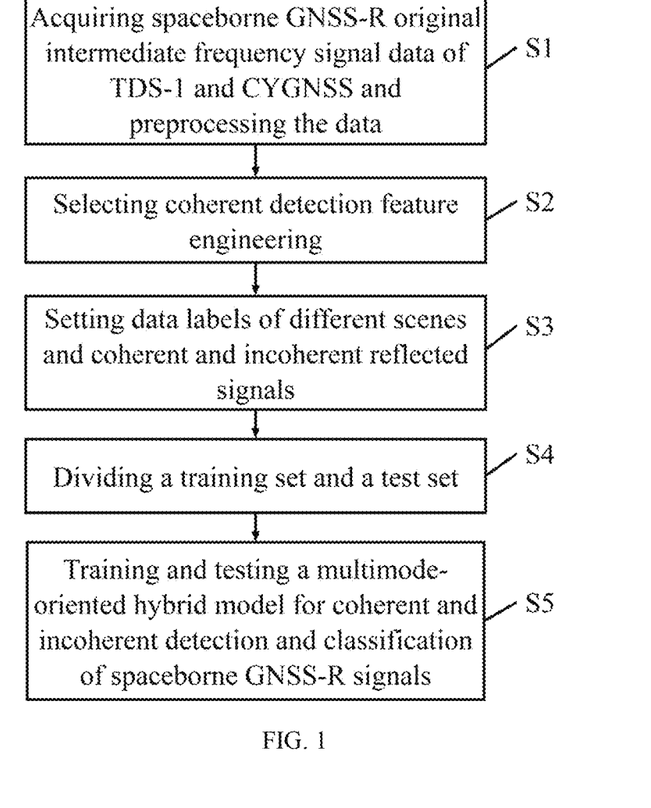
FIG. 1 is a flow chart of a method according to the disclosure.

An implementation flow of a technical scheme of a detection method of spaceborne GNSS-R original intermediate frequency coherent reflection signals in ocean, polar and inland water areas is shown in FIG. 1, and the method includes following steps:

step S1, acquiring spaceborne GNSS-R original intermediate frequency signal data of TDS-1 and CYGNSS and preprocessing the data.

The spaceborne GNSS-R original intermediate frequency reflected signal data is a single-frequency multi-constellation GNSS (GPS/Galileo/BeiDou-3) original intermediate frequency signal observation data set of a TDS-1 satellite and a CYGNSS satellite, and the preprocessing of the spaceborne GNSS-R original intermediate frequency signal observation data includes direct signal processing, reflected signal processing, observations extraction and data quality control, and a specific implementation process of data preprocessing is as follows.

Step S1.1, the direct signal processing and single-frequency GPS/Galileo/BeiDou-3 reflected signal processing. The direct signal processing uses a general GNSS signal processing scheme. Firstly, a code offset and carrier Doppler are roughly collected, and then a combination of delay locked loop (DLL) and phase locked loop (PLL) is used to track a direct signal. Outputs of the direct signal processing include position, velocity and time (PVT) estimation of the TDS-1 satellite and the CYGNSS satellite, signal parameters (code delay, Doppler frequency and carrier phase) of the direct signal, and decoded navigation data bits, etc.

Main inputs of bistatic geometry calculation are positions and velocities of a GNSS-R receiver and a GNSS transmitter. Then, a distance delay difference between the direct signal and a reflected signal is calculated, and a calculation formula is:

$$\delta\rho_{dr}^{OL}(t_0) = |R(t_0) - S'(t_0)| + |T(t_0 - \delta t_r) - S'(t_0)| - |T(t_0 - \delta t_d) - R(t_0)| \quad (13),$$

where, $T(t_0)$, $R(t_0)$ and $S'(t_0)$ are positions of a transmitter, a receiver and a reflection point respectively, $\delta t_d$ and $\delta t_r$ are propagation times of the direct signal and the reflected signal, respectively.

Step S1.2, the observations extraction. The GNSS-R receiver on CYGNSS or TDS-1 performs OL tracking and generates I and Q channel correlator outputs. These correlator outputs are used to derive signal-to-noise ratio (SNR) and carrier phase estimation, where calculation formulas are as follows:

$$SNR_{R,i} = \frac{\sqrt{IP_{R,i}^2 + QP_{R,i}^2} \cdot \sqrt{F_s}}{P_{N,i}}, \quad (14)$$

$$\delta\hat{\Phi}_{R,i} = \frac{-\arctan 2(QP_{R,i} \cdot D_{R,i}, IP_{R,i} \cdot D_{R,i}) \cdot \lambda_i}{2\pi}, \quad (15)$$

where $F_s$ is a sampling rate, $P_{N,i}$ is a noise power, regarded as a constant of each tracked GNSS signal, $\tau_i$ is the width of PRN code chip, $\delta\hat{\Phi}_{R,i}$ is a residual carrier phase estimation and $D_{R,i}$ is a navigation data bit.

In addition to the above observations, the extracted observations also include NBRCS, coherence coefficient, circle length of phase difference, circle kurtosis of phase difference, power DDM, reflectivity DDM, bistatic radar cross section (BRCS) and time delay Doppler waveform, where, the calculation formulas of reflectivity DDM, the bistatic radar cross section (BRCS) DDM and the normalized bistatic radar cross section (NBRCS) are as follows:

the reflectivity DDM is estimated as follows:

$$\Gamma(\tau, f) = \frac{(4\pi)^2 P_g(\tau, f)(R_r(\tau_p, f_p) + R_t(\tau_p, f_p))^2}{\lambda^2 G_r(\tau_p, f_p) EIRP(\tau_p, f_p)}, \quad (16)$$

where $R_t$ and $R_r$ are distances from a reflector and the receiver to a specular reflection point respectively, $G_r$ is a receiver antenna gain, $\lambda$ is a reflected signal wavelength, EIRP is a transmitter equivalent isotropic radiation power of a right-handed circularly polarized (RHCP) direct signal, and $P_g$ is a power of a DDM;

the bistatic radar cross section (BRCS) DDM is estimated as follows:

$$BRCS(\tau, f) = \frac{(4\pi)^3 P_g(\tau, f)(R_r(\tau_p, f_p) R_t(\tau_p, f_p))^2}{\lambda^2 G_r(\tau_p, f_p) EIRP(\tau_p, f_p)}, \quad (17)$$

the normalized bistatic radar cross section (NBRCS) is calculated as follows:

$$NBRCS(\tau_p, f_p) = \frac{BRCS(\tau_p, f_p)}{A_{eff}}, \quad (18)$$

where $A_{eff}$ is an effective scattering area of a selected area near a mirror point.

Step S1.3, quality control. In the process of data processing, quality control measures should be taken to obtain more reliable observations. Specific control follows the following standards.

a, for ocean scenes, GNSS signals with a wind speed greater than 8 m/s and an effective wave height greater than 1.2 m are deleted by using reference data of an ERA5 wind speed and an effective wave height, so as to ensure carrier signal tracking under relatively calm ocean surface conditions.

b, data with an antenna gain less than 0 dBi is deleted; if the antenna gain is too small, the signal is weakened or inaccurate.

c, for the CYGNSS satellite, since blackbody calibration of DDMI of CYGNSS is performed every 60 seconds, when the DDMI is connected to an internal load instead of a CYGNSS scientific antenna, no effective reflected signal is observed during the blackbody calibration. Complex waveform (CW) products are not marked with the blackbody calibration in observation, so "black_body_ddm" of a variable "quality_flags" in CYGNSS primary data is used to mark Raw IF observations during calibration by matching a GPS time, and the Raw IF observations are deleted.

Figure 2:
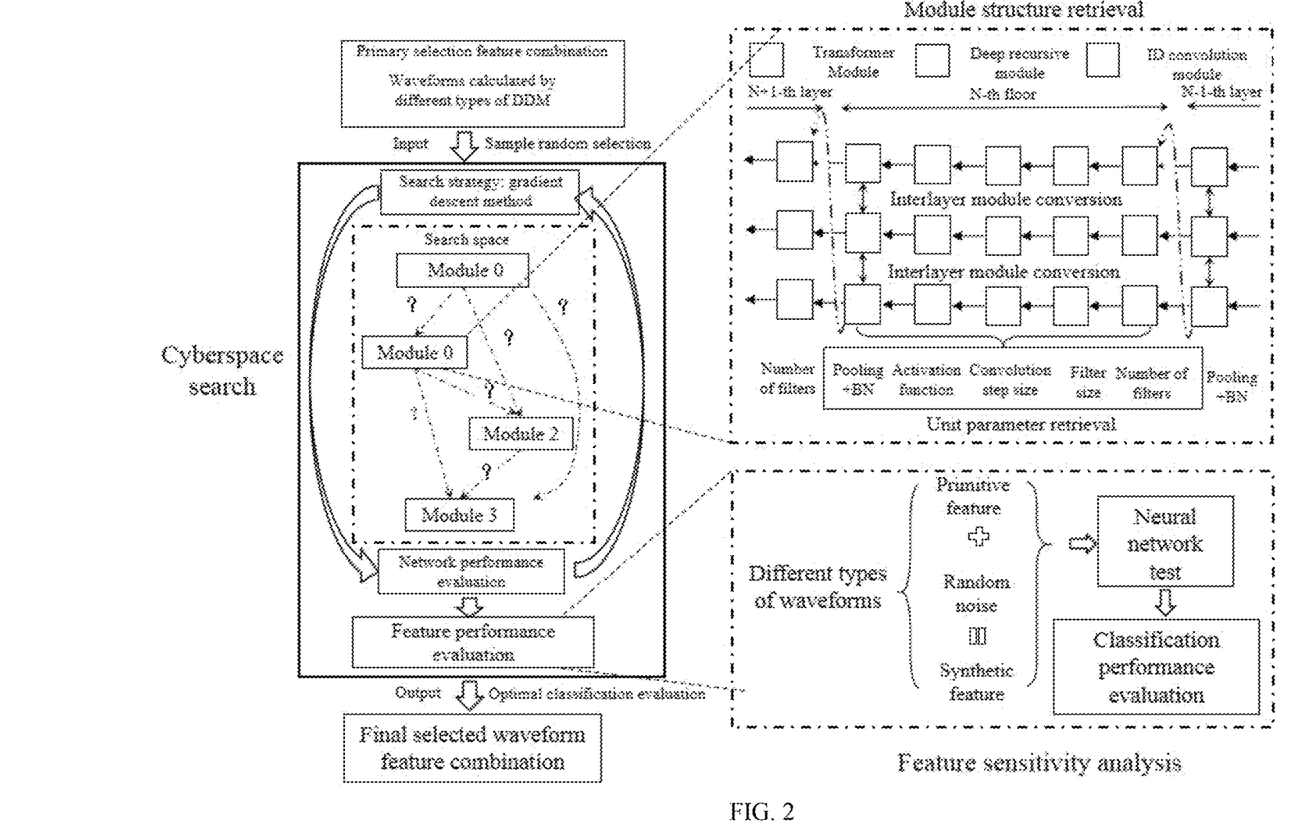
FIG. 2 is a spaceborne GNSS-R waveform feature selection model based on network architecture search in an embodiment of the disclosure.

Step S2, selection of coherent detection feature engineering. That is, features reflecting differences between coherent reflection and incoherent reflection are selected, where the features include observations of 50 Hz SNR, carrier phase difference, NBRCS, circle length, circle kurtosis and coherence coefficient extracted from observation data. In addition, considering reflection information related to geographical location and incident geometry, the coordinates of reflection points and incident angles of reflection points are added as auxiliary features. At the same time, other metadata variables (including leading edge slope derived from DDM, receiver antenna gain, transmitter equivalent isotropic radiation power, effective scattering area of DDM and distance correction gain) affecting a coherent detection performance are also considered. In addition to the above variables, in order to fully tap and utilize the key features of coherent and incoherent signals in DDM and DDM waveforms, an optimal waveform combination is selected as an input feature of the detection model from three types of DDM (reflectivity DDM, bistatic radar cross section (BRCS) DDM and power DDM), and integrated Doppler delay waveforms and integrated time delay Doppler waveforms (six waveforms in total) calculated by different DDM. In order to further optimize the combination of waveform features for coherent detection, the embodiment adopts a spaceborne GNSS-R waveform feature selection model based on network architecture search to select waveform features with significant sensitivity to coherent and incoherent signals. The model includes two modules of network structure search and feature sensitivity analysis. The network structure search uses different types of waveform feature combinations to classify, train and learn multiple model structures, and optimizes a network structure to improve a classification expression ability; a key lies in designing an overall structure, a hierarchical structure and a unit structure of a model, considering a reasoning relationship of time and space features. The feature sensitivity analysis quantitatively evaluates an influence of features on classification precision, verifies the model and the features through random test sets, analyzes a learning ability and a feature classification performance of network models, and finally selects a best feature combination.

S3, setting of data labels of different scenes and coherent and incoherent reflected signals. A setting method is manually marking Raw IF signal processed data based on visual inspection to distinguish coherent reflection and incoherent reflection, with label 1 representing the coherent reflection and label 0 representing the incoherent reflection. In addition, in order to classify different scenes of coherent and incoherent reflected signals, there is a need to set labels of ocean, polar, inland water and land scenes as 0, 1, 2 and 3 respectively.

S4, division of the training set and the test set. A method for dividing the training set and the test set is randomly scrambling marked data and dividing into the training set and the test set, where the training set accounts for 60% and the test set accounts for 40%.

S5, a multimode-oriented hybrid model for coherent and incoherent detection and classification of spaceborne GNSS-R signals sis trained and tested, the training set is used to train the model, the trained detection model is applied to the test data set, and obtained detection results are compared and evaluated with a classical coherent detection algorithm.

Figure 3:
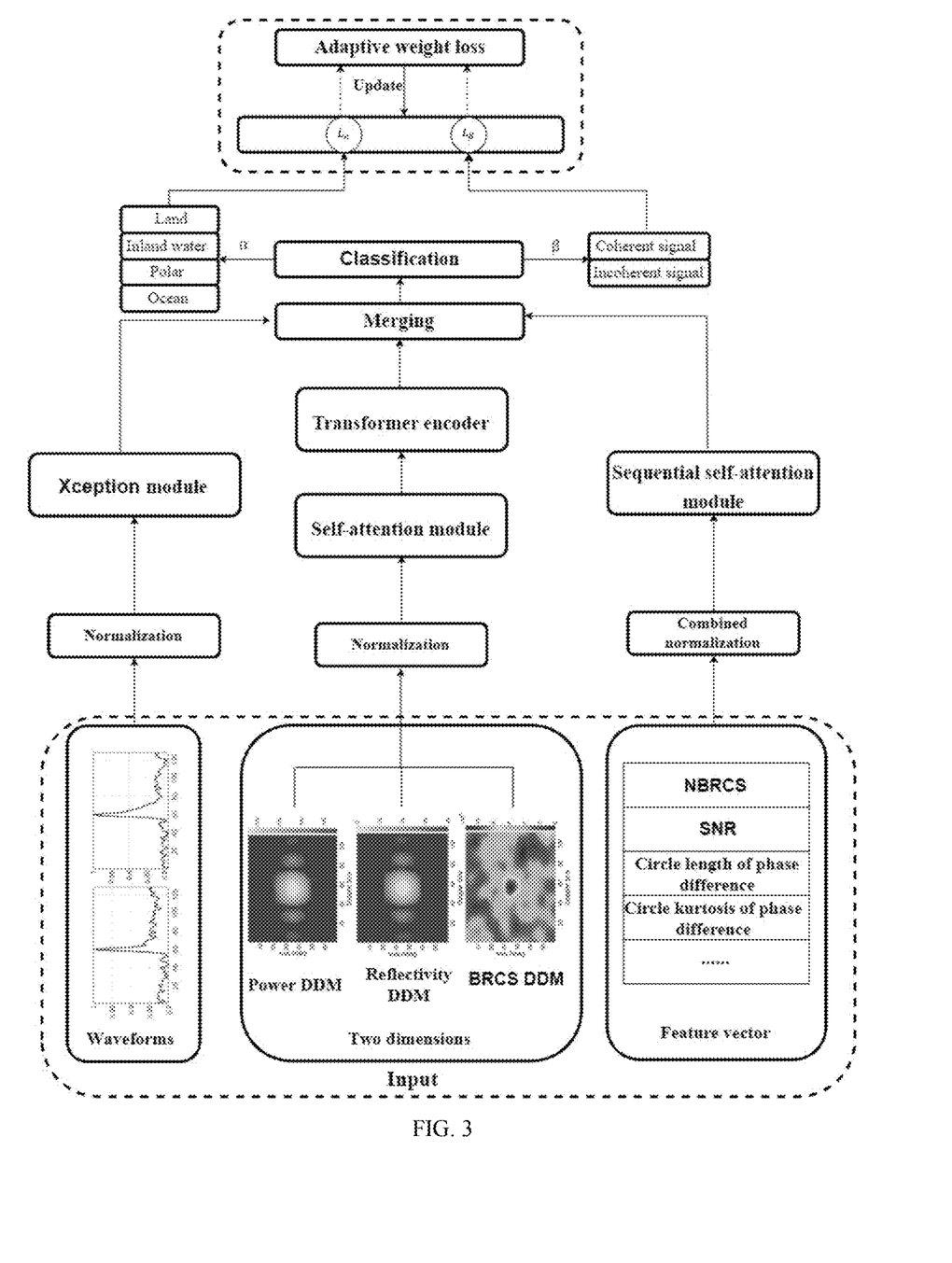
FIG. 3 is a structural diagram of a model of a detection method of spaceborne GNSS-R original intermediate frequency coherent reflection signals in ocean, polar and inland water areas in an embodiment of the disclosure.
Figure 4A:
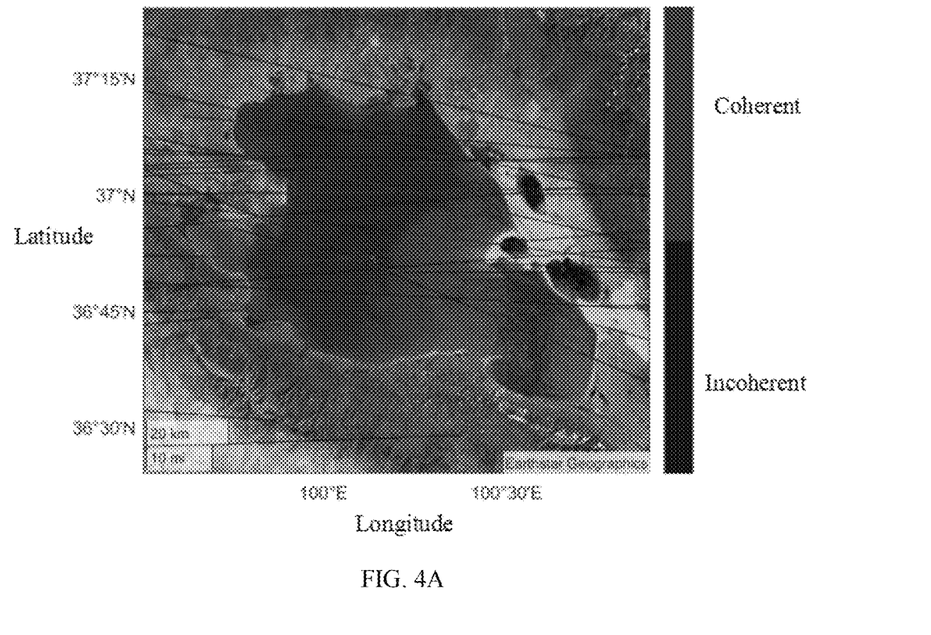
FIG. 4A is a diagram showing detection results of spaceborne GNSS-R coherent signals on surfaces of Qinghai Lake in an embodiment of the disclosure.
Figure 4B:
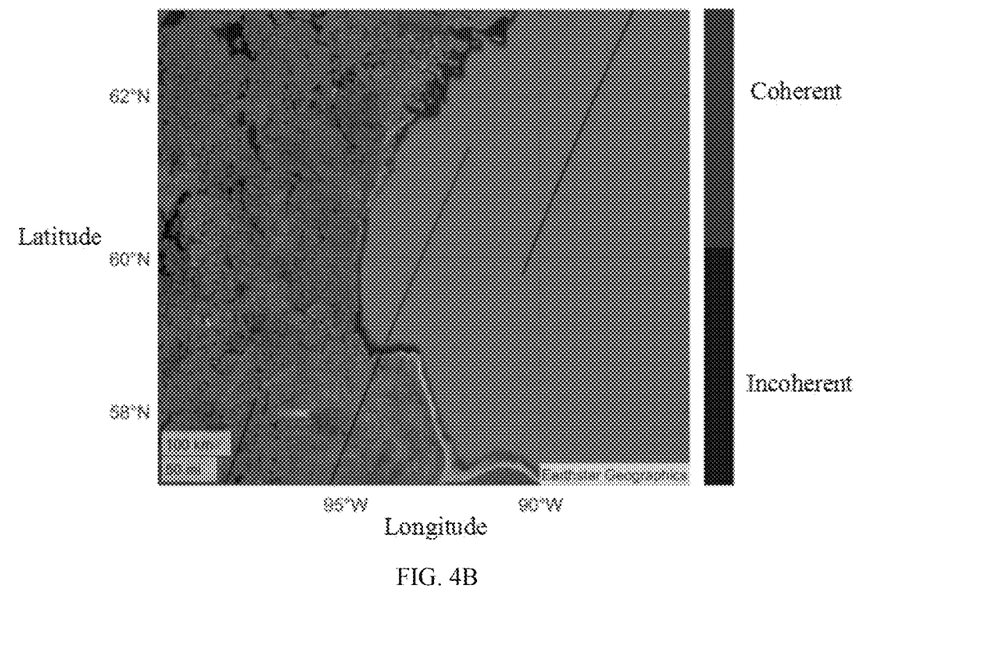
FIG. 4B is a diagram showing detection results of spaceborne GNSS-R coherent signals on surfaces of ocean in an embodiment of the disclosure.
Figure 4C:
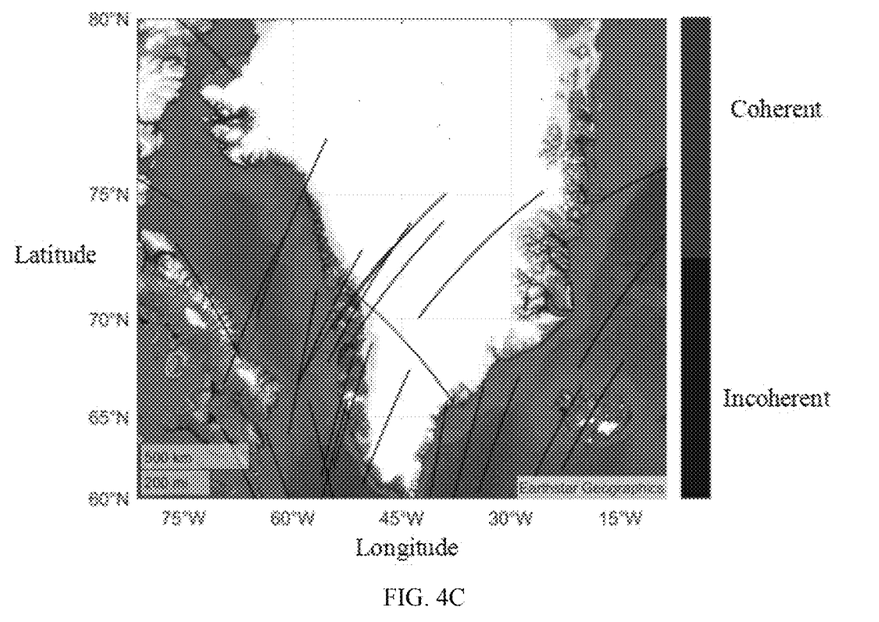
FIG. 4C is a diagram showing detection results of spaceborne GNSS-R coherent signals on surfaces of sea ice in an embodiment of the disclosure.
Figure 4D:
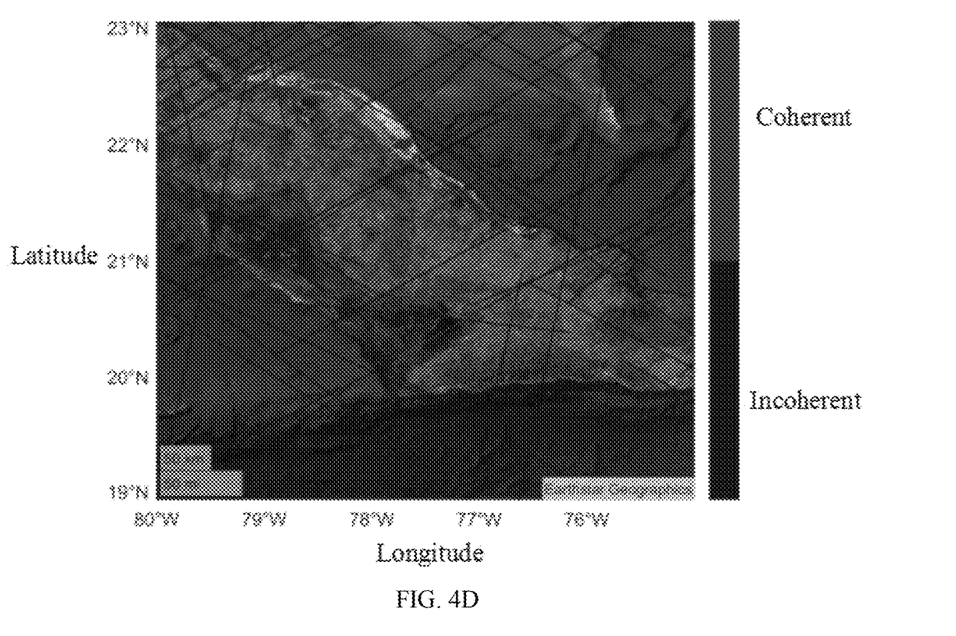
FIG. 4D is a diagram showing detection results of spaceborne GNSS-R coherent signals on surfaces of ocean in an embodiment of the disclosure.

The training and testing of the multimode-oriented hybrid model for the coherent and incoherent detection and classification of the spaceborne GNSS-R signals (as shown in FIG. 3) are as follows.

Step S5.1, designing of a multimode-oriented hybrid model for coherence detection and classification of spaceborne GNSS-R signals. The classification hybrid model takes the finally selected one-dimensional waveform features, two-dimensional power DDM, reflectivity DDM and BRCS DDM, and feature vectors (such as signal-to-noise ratio (SNR), circle length of phase difference and circle kurtosis of phase difference, etc.) as inputs, all of which are normalized. In the updated model, these data are input into three different branches to extract deep features. In the first branch, one-dimensional waveform data is input into Xception module, where the module is specially used to extract one-dimensional features. The Xception module effectively captures the time dimension features in waveform data through its depth-separable convolution architecture, thus realizing efficient extraction of one-dimensional features. In the second branch, data of two-dimensional power DDM, reflectivity DDM and BRCS DDM are input into the module composed of self-attention mechanism. This module includes convolution layer and Softmax function, aiming to capture the spatial relationship in these two-dimensional data. After that, the data is sent to the Transformer encoder, where the encoder further extracts two-dimensional features and uses its powerful self-attention ability to capture the complex interaction and dependency between the data. In the third branch, the feature vectors such as SNR, circle length of phase difference and circle kurtosis of phase difference are normalized and input into the self-attention module to extract weighted vector features. This step optimizes the expression of features by emphasizing the correlation and importance between features, thus providing more abundant and effective information for subsequent analysis and classification.

After the three branches, the features are merged into the classification module to realize classification. The classification results α and β calculate losses $L_\alpha$ and $L_\beta$ respectively, and input the losses into the adaptive weight loss module to calculate the corresponding loss weights and update them, so that the model accelerates convergence. Through the joint application of Xception module, self-attention mechanism and Transformer encoder, the model may extract deep and meaningful features from different dimensions and types of data, thus providing strong feature support for the final classification task. In addition, the model may effectively solve the nonlinear classification problem, making the detection classification model more robust and generalization.

Step S5.2, the model is trained by using the training set, the trained detection model is applied to the test data set, and the obtained detection results are compared and evaluated with the classical coherent detection algorithm.

FIG. 4A-FIG. 4D show the results of four cases of coherence detection based on the method according to the disclosure using the original intermediate frequency GNSS reflected signal data from the CYGNSS satellite and the TDS-1 satellite. Statistical results of detection precision of random forest (RF), support vector machine (SVM), artificial neural network (ANN), signal-to-noise ratio (SNR), circle length ($\alpha_{circ}$), circle kurtosis ($k_{circ}$), coherence coefficient method and the method according to the disclosure are shown in Table 1.

TABLE 1

Statistics of coherence detection precision of spaceborne GNSS-R based on different methods

| Coherence index (%) | RF | SVM | ANN | SNR | $\alpha_{circ}$ | $k_{circ}$ | Coherence coefficient | Method according to the disclosure |
|---|---|---|---|---|---|---|---|---|
| Precision | 98.1 | 97.8 | 97.8 | 96.3 | 94.1 | 82.9 | 94.3 | 98.8 |
| Accuracy rate | 84.3 | 87.1 | 84.7 | 85.8 | 84.2 | 75.8 | 84.7 | 86.6 |
| Recall rate | 78.5 | 60.1 | 77.8 | 61.2 | 60.3 | 58.4 | 60.7 | 79.7 |
| F1 value | 81.6 | 70.4 | 80.9 | 69.8 | 68.7 | 67.7 | 68.9 | 82.8 |

As may be seen from the table, the coherence detection performances of the threshold method based on SNR, $\alpha_{circ}$ and $k_{circ}$ and coherence coefficient are obviously worse than the coherence detection performances of the machine learning methods based on RF, SVM and ANN, indicating that it is not only difficult to reflect the coherent or incoherent scattering features of the reflected signals only by considering a limited number of variable features, but also such detection problems are not linearly separable, and the coherence detection based on threshold leads to a large detection error. On the contrary, the coherent reflection detection method based on machine learning may effectively solve the nonlinear classification problem, but it is easy to cause overfitting, so the robustness and generalization ability of the detection model need to be improved. However, the multimode-oriented spaceborne GNSS-R coherence detection and classification hybrid model disclosed by the disclosure may fully mine the feature signals in the spaceborne GNSS reflected signals, not only may effectively solve the nonlinear classification problem of multimode-oriented coherent and incoherent reflected signal detection, but also significantly improve the detection precision of the spaceborne GNSS-R coherent signals.

The above description is only the preferred embodiments of the disclosure and does not limit the disclosure in any form. Although the disclosure has been disclosed in the preferred embodiments, it is not intended to limit the disclosure. Any person familiar with this patent may make some changes or modify it into an equivalent embodiment by using the technical content suggested above without departing from the technical scheme of the disclosure. However, any simple modification to the above embodiment is made according to the technical essence of the disclosure.

What is claimed is:

1. A detection method of spaceborne Global Navigation Satellite System-Reflectometry (GNSS-R) original intermediate frequency coherent reflection signals in ocean, polar and inland water areas, comprising the following steps:
   step S1, acquiring spaceborne GNSS-R original intermediate frequency signal data of TechDemoSat-1 (TDS-1) and Cyclone Global Navigation Satellite System (CYGNSS) and preprocessing the data, wherein the spaceborne GNSS-R original intermediate frequency signal data is a single-frequency multi-constellation Global Navigation Satellite System (GNSS) original intermediate frequency signal observation data set of TDS-1 and CYGNSS satellites, and data preprocessing comprises direct signal processing, reflected signal processing, observations extraction and data quality control, specifically comprises the following steps:
   step S1.1, the direct signal processing and the reflected signal processing of single-frequency GNSS signals from one or more of the GPS, Galileo, and BeiDou-3 constellations;
   using a general GNSS signal processing scheme for the direct signal processing, firstly, roughly collecting a code offset and carrier Doppler, and then using a combination of delay locked loop (DLL) and phase locked loop (PLL) to track a direct signal, wherein outputs of the direct signal processing comprise position, velocity and time estimation of the TDS-1 and CYGNSS satellites, signal parameters of the direct signal and decoded navigation data bits, and
   main inputs of bistatic geometry calculation are positions and velocities of a GNSS-R receiver and a GNSS transmitter; then, calculating a distance delay difference between the direct signal and a reflected signal with a calculation formula of:

$$\delta\rho_{dr}{}^{OL}(t_0)=|R(t_0)-S'(t_0)|+|T(t_0-\delta t_r)-S'(t_0)|-|T(t_0-\delta t_d)-R(t_0)| \quad (1),$$

wherein $T(t_0)$, $R(t_0)$ and $S'(t_0)$ are positions of a transmitter, a receiver and a reflection point respectively, $\delta t_d$ and $\delta t_r$ are propagation times of the direct signal and the reflected signal, respectively;

step S1.2, the observations extraction; performing open-loop (OL) tracking by the GNSS-R receiver on a CYGNSS or a TDS-1 and generating I and Q channel correlator outputs, wherein these correlator outputs are used to derive signal-to-noise ratio (SNR) and carrier phase estimation, and calculation formulas are as follows:

$$SNR_{R,i} = \frac{\sqrt{IP_{R,i}^2 + QP_{R,i}^2} \cdot \sqrt{F_s}}{P_{N,i}}, \quad (2)$$

$$\delta\hat{\Phi}_{R,i} = \frac{-\arctan 2(QP_{R,i} \cdot D_{R,i}, IP_{R,i} \cdot D_{R,i}) \cdot \lambda_i}{2\pi}, \quad (3)$$

wherein $F_s$ is a sampling rate, $P_{N,i}$ is a noise power, regarded as a constant of each tracked GNSS signal, and $\delta\hat{\Phi}_{R,i}$ is a residual carrier phase estimation, and $D_{R,i}$ is a navigation data bit, and in addition to above observations, normalized bistatic radar cross section (NBRCS), coherence coefficient, circle length of phase difference, circle kurtosis of phase difference, power delay Doppler map (DDM), reflectivity DDM, bistatic radar cross section (BRCS) and time delay Doppler waveform are also calculated; wherein calculation formulas of the reflectivity DDM, BRCS DDM and normalized bistatic radar cross section NBRCS DDM are as follows:

the reflectivity DDM is estimated as follows:

$$\Gamma(\tau, f) = \frac{(4\pi)^2 P_g(\tau, f)(R_r(\tau_p, f_p) + R_t(\tau_p, f_p))^2}{\lambda^2 G_r(\tau_p, f_p) EIRP(\tau_p, f_p)}, \quad (4)$$

wherein $R_t$ and $R_r$ are distances from a reflector and the receiver to a specular reflection point respectively, $G_r$ is a receiver antenna gain, $\lambda$ is a reflected signal wavelength, EIRP is a transmitter equivalent isotropic radiation power of a right-handed circularly polarized (RHCP) direct signal, and $P_g$ is a power of a DDM;

the bistatic radar cross section BRCS DDM is estimated as follows:

$$BRCS(\tau, f) = \frac{(4\pi)^3 P_g(\tau, f)(R_r(\tau_p, f_p) + R_t(\tau_p, f_p))^2}{\lambda^2 G_r(\tau_p, f_p) EIRP(\tau_p, f_p)}, \quad (5)$$

the normalized bistatic radar cross section NBRCS DDM is calculated as follows:

$$NBRCS(\tau_p, f_p) = \frac{BRCS(\tau_p, f_p)}{A_{eff}}, \quad (6)$$

wherein $A_{eff}$ is an effective scattering area of a selected area near a mirror point;

step S1.3, quality control; in a process of data processing, taking quality control measures to obtain more reliable observations, wherein specific control follows following standards:

1.3a) for ocean scenes, GNSS signals with a wind speed greater than 8 m/s and an effective wave height greater than 1.2 m are deleted by using reference data of an ERA5 wind speed and an effective wave height, so as to ensure carrier signal tracking under relatively calm ocean surface conditions;

1.3b) data with an antenna gain less than 0 dBi is deleted; if the antenna gain is too small, the signal is weakened or inaccurate; and 1.3c) for a CYGNSS satellite, since blackbody calibration of DDMI of the CYGNSS is performed every 60 seconds, when the DDMI is connected to an internal load instead of a CYGNSS scientific antenna, no effective reflected signal is observed during the blackbody calibration; complex waveform CW products are not marked with the blackbody calibration in observation, so "black_body_ddm" of a variable "quality_flags" in CYGNSS primary data is used to mark and delete Raw IF observations during calibration by matching a GPS time;

step S2, selecting coherent detection feature engineering;

step S3, setting data labels of different scenes and coherent and incoherent reflected signals;

step S4, dividing a training set and a test set; and step S5, training and testing a multimode-oriented hybrid model for coherent and incoherent detection and classification of spaceborne GNSS-R signals, using the training set to train a model, applying a trained detection model to a test data set, and comparing and evaluating obtained detection results with a classical coherent detection algorithm, specifically as follows:

step S5.1, designing a multimode-oriented hybrid model for coherence detection and classification of spaceborne GNSS-R signals; taking finally selected one-dimensional waveform features, two-dimensional power DDM, reflectivity DDM and BRCS DDM, and feature vectors as inputs with all normalized by a classification hybrid model; in an updated model, inputting these data into three different branches to extract deep features; in a first branch, inputting one-dimensional waveform data into an Xception module, wherein the module is used to extract one-dimensional features; effectively capturing time dimension features in waveform data by the Xception module through a depth-separable convolution architecture thereof, thus realizing efficient extraction of the one-dimensional features; in a second branch, inputting data of two-dimensional power DDM, reflectivity DDM and BRCS DDM into a module composed of a self-attention mechanism; wherein this module comprises convolution layer and Softmax function, aiming at capturing a spatial relationship in these two-dimensional data; then, sending the data to a Transformer encoder, wherein the encoder further extracts two-dimensional features and uses a powerful self-attention ability thereof to capture complex interaction and dependency between the data; in a third branch, inputting the feature vectors into a self-attention module after normalizing to extract weighted vector features; after the three branches, merging the features into a classification module to realize classification; calculating losses $L_\alpha$ and $L_\beta$ respectively by classification results $\alpha$ and $\beta$, and inputting the losses into an adaptive weight loss module to calculate corresponding loss weights and updating, making the model accelerate convergence; and step S5.2, training the model by using the training set, applying the trained detection model to the test data set, and comparing the obtained detection results with the classical coherent detection algorithm and evaluating.

2. The detection method of the spaceborne GNSS-R original intermediate frequency coherent reflection signals in the ocean, polar and inland water areas according to claim 1, wherein selecting the coherent detection feature engineering in the step S2 is: selecting features reflecting differences between coherent reflection and incoherent reflection, comprising observations of 50 Hz SNR, carrier phase difference, NBRCS, circle length, circle kurtosis and coherence coefficient extracted from observation data; adding coordinates of reflection points and incident angles of the reflection points as auxiliary features, and considering other metadata variables affecting a coherent detection performance, and selecting an optimal waveform combination as an input feature of the detection model from three types of DDM of reflectivity DDM, bistatic radar cross section BRCS and power DDM, and integrated Doppler delay waveforms and integrated time delay Doppler waveforms calculated by different DDM.

3. The detection method of the spaceborne GNSS-R original intermediate frequency coherent reflection signals in the ocean, polar and inland water areas according to claim 2, wherein a spaceborne GNSS-R waveform feature selection model based on network architecture search is used to select waveform features with significant sensitivity to coherent and incoherent signals, and the model comprises two modules of network structure search and feature sensitivity analysis;

the network structure search uses different types of waveform feature combinations to classify, train and learn multiple model structures, and optimizes a network structure to improve a classification expression ability; a key lies in designing an overall structure, a hierarchical structure and a unit structure of a model, considering a reasoning relationship of time and space features; and the feature sensitivity analysis quantitatively evaluates an influence of features on classification precision, verifies the model and the features through random test sets, analyzes a learning ability and a feature classification performance of network models, and finally selects a best feature combination.

4. The detection method of the spaceborne GNSS-R original intermediate frequency coherent reflection signals in the ocean, polar and inland water areas according to claim 1, wherein a method for setting the data labels of the different scenes and the coherent and incoherent reflected signals in the step S3 is manually marking Raw IF signal processed data based on visual inspection to distinguish coherent reflection and incoherent reflection, with label 1 representing the coherent reflection and label 0 representing the incoherent reflection, and setting labels of ocean, polar, inland water and land scenes as 0, 1, 2 and 3 respectively.

5. The detection method of the spaceborne GNSS-R original intermediate frequency coherent reflection signals in the ocean, polar and inland water areas according to claim 1, wherein a method for dividing the training set and the test set in the step S4 is randomly scrambling marked data and dividing into the training set and the test set, wherein the training set accounts for 60% and the test set accounts for 40%.

* * * * *